(12) United States Patent
Haglund et al.

(10) Patent No.: US 9,460,520 B2
(45) Date of Patent: Oct. 4, 2016

(54) METHOD AND ARRANGEMENT FOR IDENTIFYING A DIFFERENCE BETWEEN A FIRST 3D MODEL OF AN ENVIRONMENT AND A SECOND 3D MODEL OF THE ENVIRONMENT

(71) Applicant: Vricon Systems AB, Linkoeping (SE)

(72) Inventors: Leif Haglund, Brokind (SE); Johan Borg, Linkoeping (SE); Ingmar Andersson, Linkoeping (SE); Folke Isaksson, Linkoeping (SE)

(73) Assignee: Vricon Systems AB, Linkoeping (SE)

( * ) Notice: Subject to any disclaimer, the term of this patent is extended or adjusted under 35 U.S.C. 154(b) by 264 days.

(21) Appl. No.: 14/188,314

(22) Filed: Feb. 24, 2014

(65) Prior Publication Data

US 2015/0243047 A1    Aug. 27, 2015

(51) Int. Cl.
| | |
|---|---|
| *G06K 9/46* | (2006.01) |
| *G06T 7/40* | (2006.01) |
| *G06K 9/00* | (2006.01) |
| *G06K 9/62* | (2006.01) |
| *G06T 17/05* | (2011.01) |

(52) U.S. Cl.
CPC ............ *G06T 7/407* (2013.01); *G06K 9/0063* (2013.01); *G06K 9/00214* (2013.01); *G06K 9/6215* (2013.01); *G06T 17/05* (2013.01); *G06K 2209/40* (2013.01); *G06T 2207/10028* (2013.01); *G06T 2207/30184* (2013.01)

(58) Field of Classification Search
CPC .................. G06T 7/407; G06T 17/05; G06T 2207/10028; G06T 2207/30184; G06K 9/0063; G06K 9/00214; G06K 9/6215
See application file for complete search history.

(56) References Cited

U.S. PATENT DOCUMENTS

| | | | |
|---|---|---|---|
| 7,583,271 B2 | 9/2009 | Kawakami et al. | |
| 8,633,970 B1 * | 1/2014 | Mercay | G06F 3/14 345/633 |
| 9,041,711 B1 * | 5/2015 | Hsu | G06T 17/20 345/420 |
| 9,171,402 B1 * | 10/2015 | Allen | G06T 17/05 |
| 9,208,606 B2 | 12/2015 | Cook | |
| 2007/0025595 A1 | 2/2007 | Koizumi et al. | |
| 2009/0010507 A1 * | 1/2009 | Geng | G06T 7/0075 382/128 |
| 2009/0185741 A1 | 7/2009 | Nahari et al. | |
| 2010/0150431 A1 * | 6/2010 | Chen | G06K 9/00637 382/154 |
| 2011/0222781 A1 | 9/2011 | Nguyen et al. | |
| 2012/0177284 A1 * | 7/2012 | Wang | G06T 7/0075 382/154 |

FOREIGN PATENT DOCUMENTS

| | | |
|---|---|---|
| WO | WO 2006/113582 A2 | 10/2006 |
| WO | WO 2009/003529 A1 | 1/2009 |

OTHER PUBLICATIONS

European Patent Office, Extended European Search Report for Application No. 14165561.3, Jul. 2, 2015, 5 pages, Germany.
United States Patent and Trademark Office, Office Action for U.S. Appl. No. 15/066,511, May 10, 2016, 9 pages, U.S.A.

* cited by examiner

*Primary Examiner* — Gregory M Desire
(74) *Attorney, Agent, or Firm* — Alston & Bird LLP (57) ABSTRACT

The invention relates to a method for identifying a difference between a first 3D model of an environment and a second 3D model of the environment. The first and second 3D model each comprise a plurality of points or parts, wherein each point or part of the first and second model comprises geometrical information and texture information. Corresponding points or parts of the first and second 3D model are matched based on the geometrical information and/or the texture information. The matched points or parts of the first and second model are compared to determine at least one difference value based on the geometrical information and the texture information of the first and second model. A difference between the first and second model is identified if the at least one difference value exceeds a predetermined value. The invention also relates to an arrangement, a computer program, and a computer program product.

22 Claims, 4 Drawing Sheets

METHOD AND ARRANGEMENT FOR IDENTIFYING A DIFFERENCE BETWEEN A FIRST 3D MODEL OF AN ENVIRONMENT AND A SECOND 3D MODEL OF THE ENVIRONMENT

BACKGROUND

1. Technical Field

The present disclosure relates to a method and arrangement for identifying a difference between a first 3D model of an environment and a second 3D model of the environment. In particular, the present disclosure relates to identifying a difference, wherein the first and second 3D model each comprise a plurality of points or parts, and wherein each point or part of the first and second model comprises geometrical information and texture information The present disclosure also relates to a method and arrangement for identifying a difference between a 3D model of an environment and the environment as reproduced at another timing. In particular, the present disclosure relates to identifying a difference, wherein said reproduction of the environment comprising at least one 2D image, and wherein each point or part of the first 3D model comprises geometrical and texture information 2. Description of Related Art A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects. This way of providing digital maps is time consuming and comprises forming two dimensional maps comprising capturing images of the terrain from an aircraft and post-processing of the captured images. It is an even more time consuming process to form three dimensional maps from captured images or range data sets of the terrain/infrastructure.

WO 2009/003529 relates to another type of geographical information system. It relates to an arrangement and a method for providing a three dimensional map representation of an area. The arrangement comprises a processing unit arranged to, for a plurality of time recorded, overlapping images of the area to be stereo processed, associate navigation states so that each pixel of each time recorded image is correlated to a corresponding navigation state and to perform the stereo processing based on the associated navigation states that all pixels in the map representation are specified in three geographical dimensions.

It is desirable to detect changes in the environment. These changes can be due natural variations like flooding, earthquakes, moving glaciers, falling rocks, erosions, or the like. They can also be due to growing plants or trees, due to different seeds on fields or the like. They can also be due to human made interactions like construction working (for example for building infrastructure, buildings, etc. . . . ), removing or destroying of constructions (for example, due to war, due to fire, due to forces of nature, due to dismantling or demolishing of buildings, constructions for other purposes, etc.).

For detecting these changes, a common way is to compare maps or images. This is often done in a manual way to find differences between them. This is a time-consuming task.

BRIEF SUMMARY

One object of the present invention is to improve the process of identifying differences in an environment.

This object is achieved by method for identifying a difference between a first 3D model of an environment and at least a second 3D model of the environment. The first and second 3D model each comprises a plurality of points or parts, wherein each point or part of the first and second model comprises geometrical information and texture information. Corresponding points or parts of the first and second 3D model are matched based on the geometrical information and/or the texture information. The matched points or parts of the first and second model are compared to determine at least one difference value based on the geometrical information and the texture information of the first and second model.

This method can be performed in a highly automated way, thus reducing the amount of time and/or workload an operator has to spend for identifying differences.

In one example, an uncertainty for the geometrical information is associated to each point or part of the respective 3D model and an uncertainty for the texture information is associated to each point or part of the respective model. A difference between the first and second model is identified for each point or part based on the determined at least one difference value and based on the geometrical information uncertainty for the respective model and/or the texture information uncertainty for the respective model.

This has the advantages that one can differ between differences which originate from measurement uncertainties and differences which originate from actual changes in the environment.

In one example the geometrical information uncertainty at each point or part is based on a local geometry of the 3D model at that point or part.

By doing so a refined method is achieved for differing between differences which originate from measurement uncertainties and differences which originate from actual changes in the environment.

In one example, the geometrical information uncertainty and/or texture information uncertainty is based on a number of measurements on which the respective model is based for each point or part of the respective 3D models.

In one example, the geometrical information uncertainty and/or texture information uncertainty is based on a spread in measurements on which the respective model is based for each point or part of the respective 3D models.

In one example, the geometrical information uncertainty comprises a value for the uncertainty in at least two directions and/or at least one value related to a distance and/or at least one probability value.

All these examples present methods, which in a refined way can differ between differences which originate from measurement uncertainties and differences which originate from actual changes in the environment.

In one example the texture information comprises colour information and/or grey scale information.

By doing so, even differences which do not originate from a changed geometrical shape in the environment can be identified.

In one example the texture information uncertainty comprises an uncertainty related to the colour and/or greyscale and/or a frequency value and/or a grey scale value and/or a percentage value.

This allows differing between differences which originate from imprecise equipment, for example imprecise camera sensors, and differences which actually originate from differences in the environment.

In one example comparing the first and second 3D model comprises, for each point or part of the first 3D model, searching for a closest point in the second 3D model and to determine the at least one difference based on a found closest point in the second 3D model.

This will result in that differences which originate from shifts in the models will not falsely be identified as differences in the environment.

In one example comparing the first and second 3D model further comprises, for each point or part of the first 3D model, searching for a closest point in the second 3D model to determine at least one first difference value for that point or part. It also comprises, for each point or part of the second 3D model, searching for a closest point in the first 3D model to determine at least one second difference value for that point or part. The at least one difference value is determined based on the at least one first difference value and the at least one second difference value.

By doing so more differences in the environment can be identified. For example, both additional constructions/objects and removed constructions/objects will be identified.

In one example the geometrical information of the first and the second 3D model is defined by a mesh modelling the environment in three dimensions, said mesh comprising nodes interconnected by edges and having surfaces boarded by the edges.

This allows for a practical implementation of the method.

In one example a plurality of the nodes and/or edges and/or surfaces of the mesh are associated to an attribute. The attribute comprises the texture information and/or the texture information uncertainty and/or the geometrical information uncertainty.

This allows for a practical implementation of the method as well.

In one example the geometrical information comprises coordinate information in a three dimensional coordinate system, such as a geo-referenced coordinate system.

In this way identified differences in the environment can be connected to specific positions.

In one example identified differences are classified, which comprises determining whether the identified difference is caused by natural variations.

This allows differing between differences caused by human interaction actions and differences caused by nature.

In one example the determination whether the identified difference is caused by natural variations is based on attribute information associated to the respective 3D model or measurements on which the respective model is based. The attribute information comprises at least one of the following: time of the year, daytime, resolution, from which source or sources the 3D model or measurement is originating, in which colours images are taken.

By doing this the classification can be automated.

In one example, the information related to the part or points of the models for which a difference has been identified is presented.

In one example the presented information comprises information identifying the point or part for which the difference has been identified and a presentation of the identified difference.

In one example the presented information is visualized in the first and/or second 3D model.

The above examples facilitate for a user of the method to draw conclusions from the identified differences.

The object is also achieved by a computer program, which comprises a program code for executing the method for identifying a difference between a first 3D model of an environment and a second 3D model of the environment.

The object is also achieved by a computer program product, which comprises a program code stored on a computer readable media for executing the method for identifying a difference between a first 3D model of an environment and a second 3D model of the environment.

The object is also achieved by an arrangement for identifying a difference between a first 3D model of an environment and a second 3D model of the environment. The arrangement comprises a memory or means for having access to the first and second 3D model. The first and second 3D model each comprises a plurality of points or parts, wherein each point or part of the first and second model comprises geometrical information and texture information. The arrangement also comprises a processing element. The processing element is arranged to match corresponding points or parts of the first and second 3D model based on the geometrical information and/or the texture information It is also arranged to compare the matched points or parts of the first and second model to determine at least one difference value based on the geometrical information and the texture information of the first and second model.

The arrangement performs the process of identifying differences in an environment in a highly automated way, thus reducing the amount of time and/or workload an operator has to spend for identifying differences.

In one example, the memory or means for having access to the first and second 3D model are arranged to store an uncertainty for the geometrical information. The geometrical information uncertainty is associated to each point or part of the respective 3D model. The memory or means for having access to the first and second 3D model are also arranged to store an uncertainty for the texture information. The texture information uncertainty is associated to each point or part of the respective model. The processing element is further arranged to identify a difference between the first and second model for each point or part based on the determined at least one difference value and based on the geometrical information uncertainty for the respective model and/or the texture information uncertainty for the respective 3D model.

This has the advantages that one can differ between differences which originate from measurement uncertainties and differences which originate from actual changes in the environment.

In one example the processing element is further arranged to classify an identified difference between the first and second model. This comprises to determine whether the identified difference is caused by natural variations.

This allows differing between differences caused by human interaction actions and differences caused by nature.

In one example the arrangement comprises a presentation unit. The presentation unit is arranged to present information related to the part or points of the models for which a difference has been identified.

The object is also achieved by a method for identifying a difference between a 3D model of an environment and the environment as reproduced at another timing. The reproduction of the environment comprises at least one 2D image, wherein each point or part of the 3D model comprises geometrical and texture information. Corresponding points or parts of the 3D model and the at least one 2D image are matched based on the texture information in the 3D model and texture information in the at least one 2D image. At least one difference value for the texture information is determined for each corresponding part or point of the first 3D model and the at least one 2D image.

This has the advantage that one does not need to have two 3D models of the environment. This allows determining difference values, for example, even for moments of time where no 3D model is available.

In one example, a geometrical information uncertainty is associated to each point or part of the 3D model, and/or a texture information uncertainty is associated to each point or part of the 3D model. A difference between the 3D model and the at least one 2D image is identified based on the determined at least one difference value, and based on the geometrical information uncertainty and/or the texture information uncertainty.

This allows better identifying differences in the environment compared to a moment of time where no 3D model is/was available. It further allows to differ between differences which originate from measurement uncertainties and differences which originate from actual changes in the environment.

In one example, information related to the part or points of the 3D model for which a difference has been identified is presented.

This facilitates for a user of the method to draw conclusions from the identified differences.

The object is also achieved by an arrangement for identifying a difference between a 3D model of an environment and the environment as reproduced at another timing. The arrangement comprises a memory or means for having access to the reproduction of the environment and to the first 3D model. The reproduction of the environment comprises at least one 2D image. Each point or part of the 3D model comprises geometrical and texture information. The arrangement also comprises a processing element. The processing element is arranged to match corresponding points or parts of the 3D model and the at least one 2D image reproducing the environment based on the texture information in the 3D model and texture information in the at least one 2D image. It is also arranged to determine at least one difference value for the texture information for each corresponding part or point of the first 3D model and the at least one 2D image.

The arrangement performs the process of identifying differences in an environment in a highly automated way, thus reducing the amount of time and/or workload an operator has to spend for identifying differences. The arrangement further has the advantage that one does not need to have two 3D models of the environment. This allows determining difference values, for example, even for moments of time where no 3D model is available.

In one example the memory or means for having access to the 3D model is further arranged to store a geometrical information uncertainty associated to each point or part of the 3D model and to store a texture information associated to each point or part of the 3D model. The processing element is further arranged to identifying a difference between the 3D model and the 2D image for each point or part based on the determined at least one difference value and based on the geometrical information uncertainty and/or the texture information uncertainty.

This allows better identifying differences in the environment compared to a moment of time where no 3D model is/was available. It further allows to differ between differences which originate from measurement uncertainties and differences which originate from actual changes in the environment.

In one example the arrangement further comprises a presentation unit arranged to present information related to the part or points of the model and/or image for which a difference has been identified.

This facilitates for a user of the arrangement to draw conclusions from the identified differences.

The object is also achieved by a computer program comprising a program code for executing the method for identifying a difference between a 3D model of an environment and the environment as reproduced at another timing.

The object is also achieved by a computer program product comprising a program code stored on a computer readable media for executing the method for identifying a difference between a 3D model of an environment and the environment as reproduced at another timing.

DETAILED DESCRIPTION OF VARIOUS EMBODIMENTS

Figure 1:
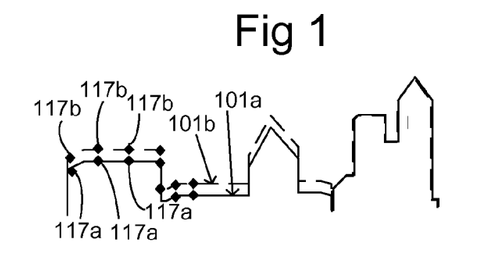
FIG. 1 shows a side view of an example of a first 3D model and a second 3D model.

In FIG. 1, a difference between a first 3D model 101*a* of an environment and a second 3D model 101*b* of the environment is schematically illustrated. The first 3D model is illustrated with a full line. The second 3D model is illustrated with a broken line. The first 3D model 101*a* comprises a plurality of first points or parts 117*a*. Each first point or part 117*a* comprises geometrical information and texture information. The second 3D model 101*b* comprises a plurality of second points or parts 117*b*. Each second point or part 117*b* comprises geometrical information and texture information. Only a few of the first points or parts 117*a* and second points or parts 117*b* are shown in the figure in order to make the figure clear.

The geometrical information comprises coordinate information in a three dimensional coordinate system. In one example, the coordinate system is a geo-referenced coordinate system. The texture information comprises in one example colour information and/or grey scale information.

In one example the first 3D model and/or the second 3D model is formed based on 2D images, distance measurements such as LIDAR etc. When basing the 3D model on 2D images, the 3D models may have been provided by establishing stereo matching correspondence for stereo pairs based on different combinations of two 2D images and building the 3D model based on the established stereo matching correspondence for the stereo pairs. Details related to building 3D models from 2D images are known in the art and is left out from this description.

The first 3D model and/or the second 3D model may be represented in numerous ways. In one example, at least one of the 3D models is represented as a textured mesh. In one example, at least one of the 3D models is represented as a point cloud. In one example, at least one of the 3D models is represented as a voxel.

In one example, an uncertainty for the geometrical information is associated to each point or part of the respective 3D model. Thus the first points or parts 117a of the first 3D model 101a are each associated to a geometrical information uncertainty. Further, the second points or parts 117b of the second 3D model 101b are each associated to a geometrical information uncertainty. In the same way, a texture information uncertainty is associated to each point or part of the respective model.

The geometrical information uncertainty and the texture information uncertainty can be formed by uncertainties related to one or a plurality of factors. Thus, different types of geometrical information uncertainties and texture information uncertainties can be accounted for. Some examples are given below. In one example geometrical information uncertainty and/or the texture information uncertainty for each point or part is based on the uncertainties of different types. The geometrical information uncertainty and/or the texture information uncertainty for each point or part can be a weighted sum of uncertainties of different types.

Some types of geometrical information uncertainties and/or texture information uncertainties are isolated to individual points or parts 117a, 117b while other types of geometrical information uncertainties and/or texture information uncertainties are common for larger areas. Thus, the latter types of geometrical information uncertainties and/or texture information uncertainties are common for a plurality of points or parts.

The geometrical information uncertainty and/or the texture information uncertainty may be a value for the uncertainty in one, two or three directions. The value may be related to a distance. The value may be a probability value. In one example, the geometrical information uncertainty and/or texture information uncertainty is represented as a hypothesis.

In one example, the geometrical information uncertainty at each point or part is based on a local geometry of the 3D model at that point or part.

In one example, the geometrical information uncertainty and/or texture information uncertainty is based on a number of measurements on which the respective 3D model is based for each point or part of the respective 3D models.

In one example, the geometrical information uncertainty and/or texture information uncertainty is based on a spread in measurements on which the respective model is based for each point or part of the respective 3D models.

In one example, the texture information uncertainty comprises an uncertainty related to the colour and/or greyscale. In one example, the texture information uncertainty comprises an uncertainty related to a frequency value. In one example, the texture information uncertainty relates to a grey scale value. In one example, the texture information uncertainty relates to a percentage value.

As is understood from the above, one, some or all of the examples of geometrical information uncertainties and texture information uncertainties described herein can be selected, along with other, not disclosed types of uncertainties to form a geometrical information uncertainty and to form a texture information uncertainty.

Figure 2:
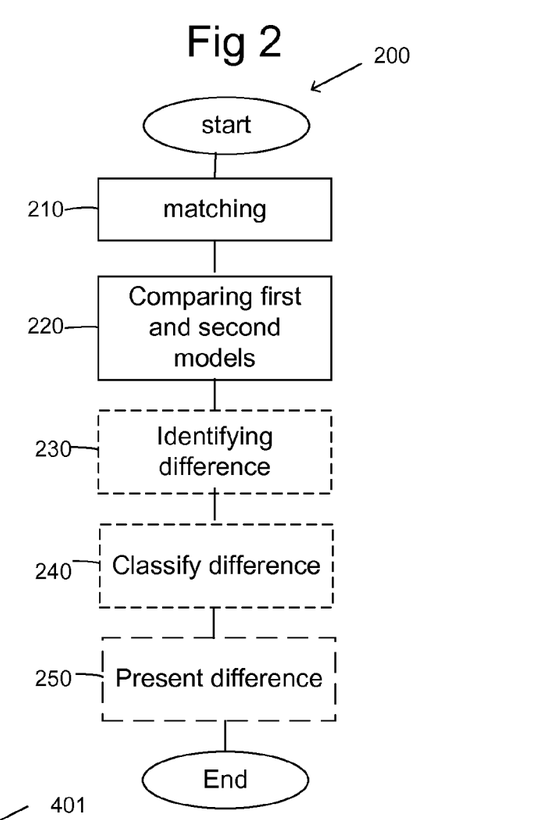
FIG. 2 is flow chart illustrating one example of a method for identifying a difference between a first 3D model of an environment and a second 3D model of the environment.

In FIG. 2, a method 200 for identifying a difference between a first 3D model of an environment and a second 3D model of the environment is illustrated. The method is based on the prerequisite that the first and second 3D model each comprises a plurality of points or parts and that each point or part of the first and second model comprises geometrical information and texture information.

The method comprises a step of matching 210 the first 3D model with the second 3D model. The matching is performed such that corresponding points or parts of the first and second 3D model are matched based on the geometrical information and/or the texture information. The first and the second model may have different accuracy, which may be taken into account in the matching.

There are many ways known in the art for achieving matching of data in two models. The matching is in one example a global matching. This means that the first and second models as a whole are matched using translation and/or rotation and/or a higher order model. The matching may for example involve using least square method(s).

In one example, wherein the models are formed based on images, the matching involves performing bundle adjustments. Given a set of images depicting a number of 3D points from different viewpoints, bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points. Bundle adjustments are known in the art and thus not described here any further.

In a next step, the matched points or parts of the first and second model are compared 220 to determine a relation between the first 3D model and the second 3D model. This is done by determining at least one difference value based on the geometrical information and the texture information of the first and second model. In one example, the comparing 220 comprises for each point or part of the first 3D model to search for a closest point in the second 3D model. The at least one difference is determined based on a found closest point in the second 3D model. Thus, a local search is performed for a closest point in the second 3D model and the difference value is determined based on the result of this search. In one example, a difference between the first and second model is identified if the at least one difference value exceeds a predetermined value.

In one example, an uncertainty for the geometrical information is associated to each point or part of the respective 3D model and/or an uncertainty for the texture information is associated to each point or part of the respective model. In one optional step, the method then further comprises a step of identifying 230 a difference between the first and second models for each point or part based on the determined at least one difference value and based on the geometrical information uncertainty for the respective model and/or the texture information uncertainty for the respective model. Examples of how the geometrical information uncertainty and the texture information uncertainty can be determined have been described in this disclosure.

The method further comprises an optional step of classifying 240 the identified difference. In one example the classification is based on whether an identified difference is caused by natural variations or by other causes such as humans, natural disasters, etc.

If the 3D models or the measurements on which the models are based is associated to information related to the time of the year, daytime, resolution, from which source the measurement is originating, in which colours image are taken, etc., this information can be used for determining whether an identified difference is based on natural variations or not. When building a 3D model of an area where the seasons have great impact on the appearance of the area, measurements can be sorted out or kept according to the seasons at which they were taken. One example is areas which in winter usually are covered by snow and/or which have deciduous trees. In these areas both colour can change between the seasons, but also the height profile. If an area gets lot of snow in winter, but roads are kept free from snow during winter, the height profile in this area changes during seasons. In that case it is advantageous to choose measurement from only one season, for example summer in building the 3D models. Also sorting out measurements according to any other predetermined requirement might be helpful, if that requirement has an impact on the appearance of the environment or on the possibility to built accurate 3D models.

The method further comprises an optional step of presenting 250 information related to the part or points of the models for which a difference has been identified. The presented information comprises in one example information identifying the point or part for which the difference has been identified and a presentation of the identified difference. In one example, the presented information is visualized in the first or second 3D model.

Figure 3A:
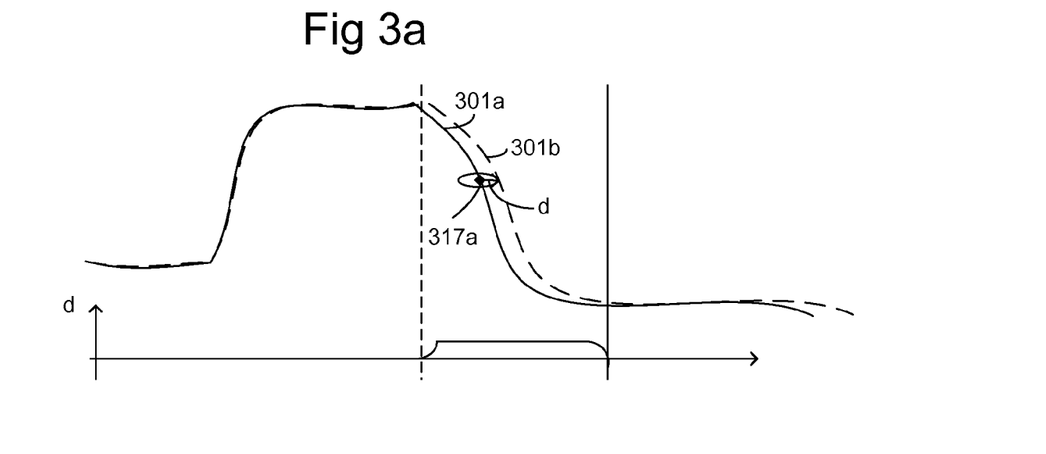
FIGS. 3*a*-3*c* illustrates examples for comparing a first and second 3D model for each point or part.
Figure 3B:
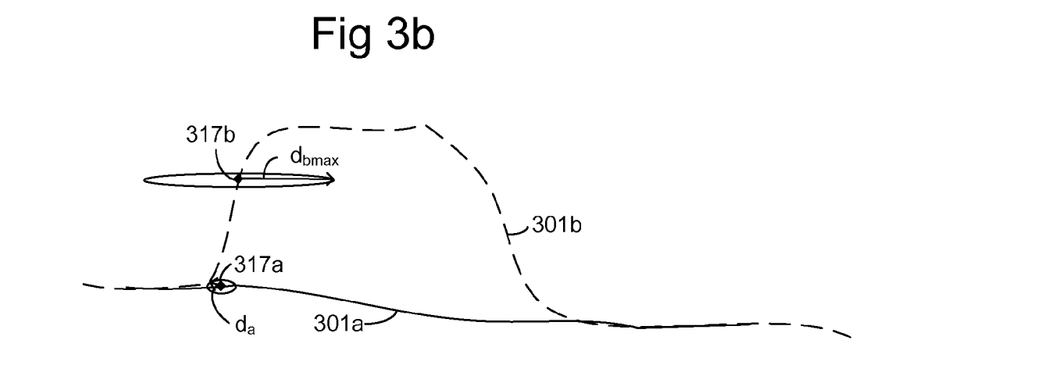
Figure 3C:
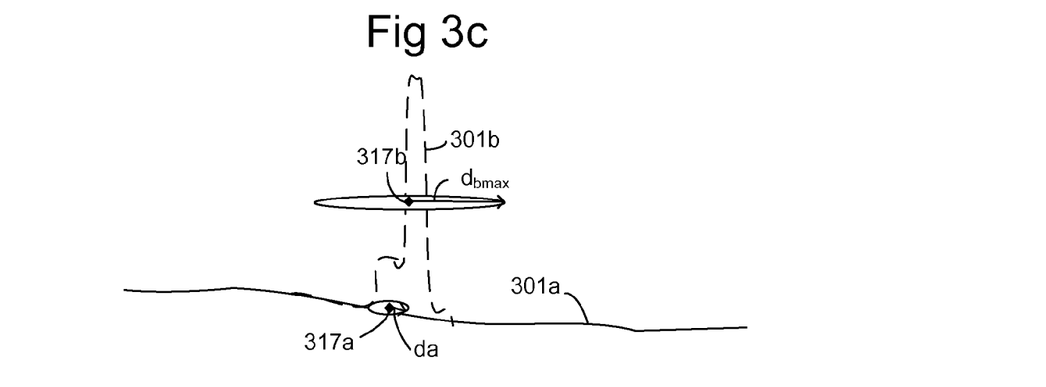

In FIGS. 3a-3c, a step of comparing a first and second 3D model comprises for each point or part of the first 3D model 301a searching for a closest point in the second 3D model 301b and to determine the at least one difference d based on a found closest point in the second 3D model. The search is in the illustrated example performed in a radius in relation to the point or part in the first model. In one example, the search is performed in two dimensions. In one example the search is performed in three dimensions. The search is performed within a search radius $d_{max}$.

In FIGS. 3b-c the step of comparing a first and a second 3D model comprises for each point or part of the first 3D model searching for a closest point in the second 3D model to determine at least one first difference value $d_a$ for that point or part, for each point or part of the second 3D model searching for a closest point in the first 3D model to determine at least one second difference value $d_b$ for that point or part, and to determine the at least one difference value based on the at least one first difference value $d_a$ and the at least one second difference value $d_b$.

Using the procedure as described in relation to FIGS. 3a-3c ensures that objects present in one of the 3D models but not the other are found.

Figure 4:
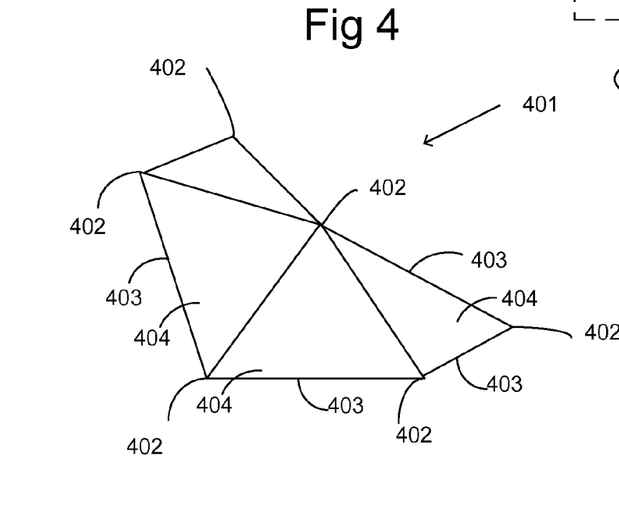
FIG. 4 illustrates schematically one example of a 3D model.

In the example of FIG. 4, geometrical information of a first 2D model and/or a second 3D model 401 is defined by a mesh modelling the environment in three dimensions. The mesh comprises nodes 402 interconnected by edges 403 and having surfaces 404 boarded by the edges. Each node and/or edge and or surface is associated to a 3D coordinate in a geographical coordinate system. In one example, a plurality of the nodes and/or edges and/or surfaces of the mesh are associated to an attribute. The attribute comprises the texture information. The attribute comprises in one example also a texture information uncertainty and/or a geometrical information uncertainty.

Figure 5:
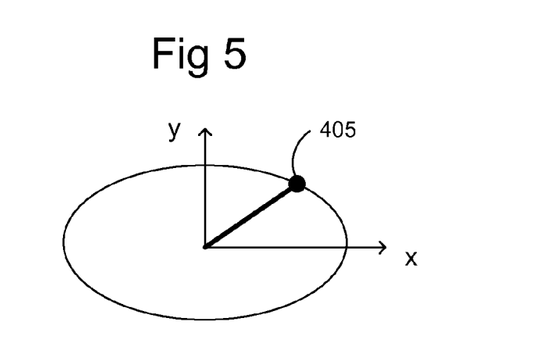
FIG. 5 illustrates schematically an example of an uncertainty associated to points or parts of a 3D model.

In FIG. 5, a geometrical information uncertainty and/or texture information uncertainty comprises a value for the uncertainty in at least two directions. The geometrical information uncertainty and/or texture information uncertainty comprises in one additional or alternative example at least one value related to a distance and/or at least one probability value.

Figure 6:
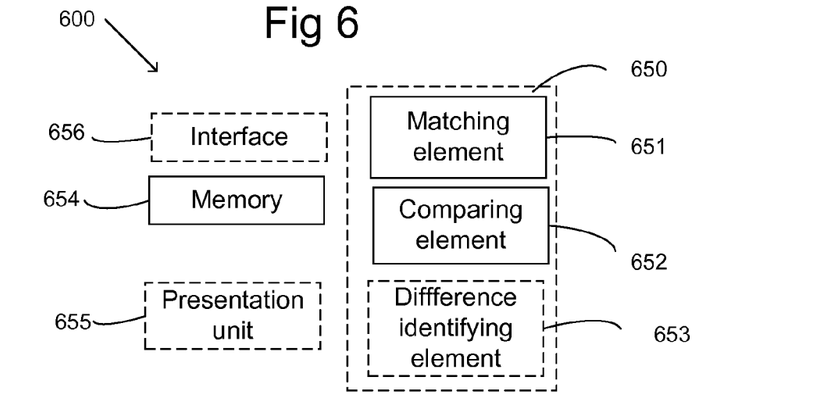
FIG. 6 is a block scheme illustrating an example of an arrangement for identifying a difference between a first 3D model of an environment and a second 3D model of the environment.

In FIG. 6, an arrangement 600 for identifying a difference between a first 3D model 101a of an environment and a second 3D model 101b of the environment is illustrated. The arrangement 600 comprises a memory 654 for having access to the first and second 3D model. In one example, the memory is arranged to temporarily store relevant parts of the first and second model. In one example the arrangement comprises means for having access to the first and second 3D model. In one example the first and second 3D model is stored in a database. In one example the first and second 3D model are stored at one or more remote locations and the means for having access to the first and second 3D model are arranged to supply the first and second 3D model via a network to the arrangement. In one example the first and second 3D model are supplied via wireless communication. In one example the first and second 3D model are supplied via wired communication. The access to the first and second model is in one example provided by means of an interface 656. The first and second 3D model each comprises a plurality of points or parts. Each point or part of the first and second models comprises geometrical information and texture information. In one example the memory comprises the first and second 3D model.

In one example, the memory 654 or means for having access to the first and second 3D model is arranged to store an uncertainty for the geometrical information, which uncertainty is associated to each point or part of the respective 3D model, and it is arranged to store an uncertainty for the texture information, which uncertainty is associated to each point or part of the respective model.

The arrangement 600 further comprises a processing element 650. The processing element 650 is arranged to match corresponding points or parts of the first and second 3D models based on the geometrical information and/or the texture information. This is in one example performed in a matching element 651 The processing element 650 is further arranged to compare the matched points or parts of the first and second model to determine at least one difference value based on the geometrical information and the texture information of the first and second model. The comparing is in one example performed in a comparing element 652. The processing element 650 is in one example arranged to identify a difference between the first and second model if the at least one difference value exceeds a predetermined value.

In one example, the processing element 650 is arranged to identify a difference between the first and second models for each point or part based on the determined at least one difference value and based on the geometrical information uncertainty for the respective model and/or the texture information uncertainty for the respective model. This is in one example performed in a difference identifying element 653.

In one example the processing element 650 is formed as one or more processing units. In one example the processing element 650 is several processing units. In one example the processing units are located at remote locations and arranged to communicate with each other.

In one example the processing element 650 is further arranged to classify an identified difference between the first and second model. The classification comprises determining whether the identified difference is caused by natural variations.

The processing element 650 comprises in one example a computer program comprising a program code for executing the identifying of a difference between a first 3D model of an environment and a second 3D model of the environment.

In one example the arrangement 600 further comprises a presentation unit 655. The presentation unit is arranged to present information related to the part or points of the first and/or second 3D model for which a difference has been identified. In one example the presentation unit is a display. In one example the presentation unit is a screen. In one example the presentation unit is a printer. In one example the presentation unit is a projector. In one example the presentation unit is arranged to receive information from the processing element.

Figure 7:
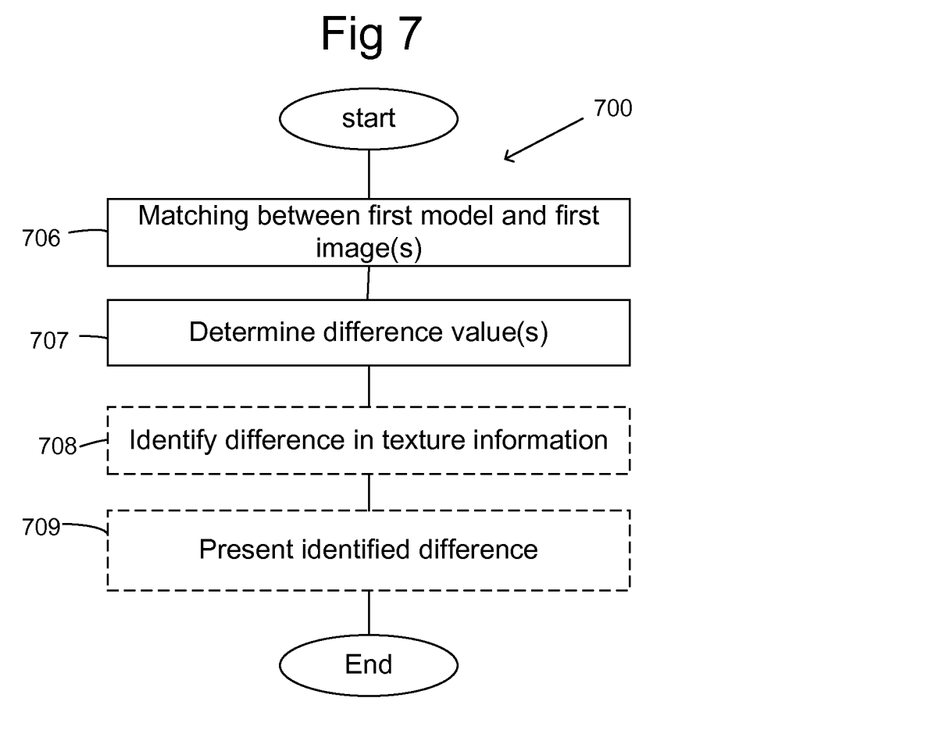
FIG. 7 is flow chart illustrating one example of a method for identifying a difference between a first 3D model of an environment and the environment as reproduced at another timing.

In FIG. 7, a method 700 for identifying a difference between a 3D model of an environment and the environment as reproduced at another timing, wherein said reproduction of the environment comprises at least one 2D image, is illustrated. Each point or part of the 3D model comprises geometrical and texture information. The method comprises the following steps.

In a first step, corresponding points or parts of the 3D model and the at least one image are matched 706 based on the texture information in the 3D model and texture information in the at least one 2D image.

There are many ways known in the art for achieving matching a 3D model with 2D images. The matching is in one example a global matching. In one example, one or a plurality of images which have been used for building the 3D model is used for matching the 2D image. Then, texture information may be matched. For example, the matching is performed using translation and/or rotation and/or a higher order model. The matching may for example involve using least square method.

In one example, wherein the 3D model is formed based on images, the matching involves performing bundle adjustments. Bundle adjustments are known in the art and thus not described here any further. In one example the matching involves establishing point correspondence between the 3D model and the at least one 2D image.

In one additional or complementing example, georeferencing information is used in the matching.

In a next step, at least one difference value for the texture information for each corresponding part or point of the first 3D model and the at least one 2D image is determined.

In one example, a geometrical information uncertainty is associated to each point or part of the 3D model and/or a texture information uncertainty is associated to each point or part of the 3D model. In this example, the method comprises an optional step 708 of identifying a difference between the 3D model and the at least one 2D image based on the determined at least one difference value, and based on the geometrical information uncertainty and/or the texture information uncertainty. Examples of how the geometrical information uncertainty and the texture information uncertainty can be determined are described earlier in this disclosure.

The method further comprises an optional step of presenting 709 information related to the part or points of the 3D model for which a difference has been identified.

Figure 8:
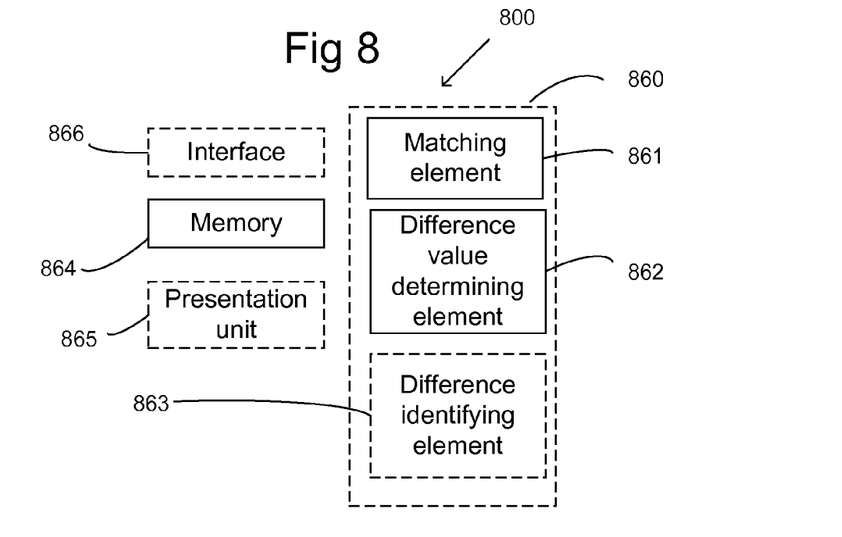
FIG. 8 is a block scheme illustrating an example of an arrangement for identifying a difference between a first 3D model of an environment and the environment as reproduced at another timing.

In FIG. 8, an example of an arrangement 800 for identifying a difference between a first 3D model of an environment and the environment as reproduced at another timing is described. The arrangement 800 comprises a memory 864 or means for having access to the reproduction of the environment comprising at least one 2D image, and to the first 3D model, wherein each point or part of the first 3D model comprises geometrical and texture information. In one example the memory 864 comprises the reproduction of the environment and the first 3D model. In one example the arrangement comprises means for having access to the reproduction of the environment and the first 3D model. In one example the reproduction of the environment and the first 3D model are stored in a database. In one example the reproduction of the environment and the first 3D model are stored at one or more remote locations and the means for having access to the reproduction of the environment and the first 3D model are arranged to supply the reproduction of the environment and the first 3D model via a network to the arrangement. In one example the reproduction of the environment and the first 3D model are supplied via wireless communication. In one example the reproduction of the environment and the first 3D model are supplied via wired communication. The access to the first and second model is in one example provided by means of an interface 866.

The arrangement 800 further comprises a processing element 860, arranged to match corresponding points or parts of the 3D model and the at least one image based on the texture information in the 3D model and texture information in the at least one 2D image. The matching is in one example performed in a matching element 861. The processing element is further arranged to determine at least one difference value for the texture information for each corresponding part or point of the first 3D model and the at least one 2D image. This is in one example performed in a difference value determining element 862. The processing element 860 is in one example arranged to identify a difference between the 3D model and the at least one 2D image if the at least one difference value for the texture information exceeds a predetermined value. In one example, the memory 864 or means for having access to the first and second 3D model is arranged to store a geometrical information uncertainty associated to each point or part of the 3D model and arranged to store a texture information associated to each point or part of the 3D model.

In one example, the processing element 650 is arranged to identifying a difference between the first and second model for each point or part based on the determined at least one difference value and based on the geometrical information uncertainty and/or the texture information uncertainty. This is in one example performed in a difference identifying element 863.

In one example the processing element 860 comprises one or more processing units. In one example the processing element comprises several processing units. In one example the processing units are located at remote locations and arranged to communicate with each other.

In one example the arrangement further comprises a presentation unit 865. The presentation unit 865 is arranged to present information related to the part or points of the model and/or image for which a difference has been identified. In one example the presentation unit is a display. In one example the presentation unit is a screen. In one example the presentation unit is a printer. In one example the presentation unit is a projector. In one example the presentation unit is arranged to receive information from the processing element.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method (200) for identifying a difference between a first 3D model (101a) of an environment and at least a second 3D model (101b) of the environment, wherein the first and second 3D model each comprise a plurality of points or parts, wherein each point or part of the first and second model comprises geometrical information and texture information, the method comprising the steps of:
   automatically matching (210), via at least one processing element, corresponding points or parts of the first and second 3D model based on the geometrical information and/or the texture information; and
   automatically comparing (220), via the at least one processing element, the matched points or parts of the first and second model to determine at least one difference value based on the geometrical information and the texture information of the first and second model,
   wherein the step of comparing the matched points or parts of the first and second model to determine the at least one difference value based on the geometrical information and the texture information comprises the substeps of:
   for each point or part of the first 3D model, searching for a closest point in the second 3D model to determine at least one first difference value for that point or part;
   for each point or part of the second 3D model, searching for a closest point in the first 3D model to determine at least one second difference value for that point or part; and
   determining the at least one difference value further based on the at least one first difference value and the at least one second difference value.

2. A method according to claim 1, wherein an uncertainty for the geometrical information is associated to each point or part of the respective 3D model and/or wherein an uncertainty for the texture information is associated to each point or part of the respective model, further comprising a step of identifying (230) a difference between the first and second model for each point or part based on the determined at least one difference value and based on the geometrical information uncertainty for the respective model and/or the texture information uncertainty for the respective model.

3. A method according to claim 2, wherein the geometrical information uncertainty at each point or part is based on a local geometry of the 3D model at that point or part.

4. A method according to claim 2, wherein the geometrical information uncertainty and/or texture information uncertainty is based on a number of measurements on which the respective model is based for each point or part of the respective 3D models.

5. A method according to claim 2, wherein the geometrical information uncertainty and/or texture information uncertainty is based on a spread in measurements on which the respective model is based for each point or part of the respective 3D models.

6. A method according to claim 2, wherein the geometrical information uncertainty comprises a value for the uncertainty in at least two directions and/or at least one value related to a distance and/or at least one probability value.

7. A method according to claim 2, wherein the texture information uncertainty comprises an uncertainty related to the colour and/or greyscale and/or a frequency value and/or a grey scale value and/or a percentage value.

8. A method according to claim 1, wherein the texture information comprises colour information and/or grey scale information.

9. A method according to claim 1, wherein the step of comparing the first and second 3D model comprises:
   for each point or part of the first 3D model, searching for a closest point in the second 3D model and determining the at least one difference based on a found closest point in the second 3D model.

10. A method according to claim 1, wherein the geometrical information of the first and the second 3D model is defined by a mesh modelling the environment in three dimensions, said mesh comprising nodes interconnected by edges and having surfaces boarded by the edges.

11. A method according to claim 10, wherein a plurality of the nodes and/or edges and/or surfaces of the mesh are associated to an attribute, said attribute comprising the texture information and/or the texture information uncertainty and/or the geometrical information uncertainty.

12. A method according to claim 1, wherein the geometrical information comprises coordinate information in a three dimensional coordinate system, such as a geo-referenced coordinate system.

13. A method according to claim 1, further comprising a step of classifying (240) an identified difference, which comprises determining whether the identified difference is caused by natural variations.

14. A method according to claim 13, wherein the determination whether the identified difference is caused by natural variations is based on attribute information associated to the respective 3D model or measurements on which the respective model is based, wherein the attribute information comprises at least one of the following: time of the year, daytime, resolution, from which source the 3D model or measurement is originating, in which colours images are taken.

15. A method according to claim 1, further comprising a step of presenting (250) information related to the part or points of the models for which a difference has been identified.

16. A method according to claim 15, wherein the presented information comprises information identifying the point or part for which the difference has been identified and a presentation of the identified difference.

17. A method according to claim 15, wherein the presented information is visualized in the first and/or second 3D model.

18. A computer program product comprising a program code stored on a non-transitory computer readable media for executing the method for identifying a difference between a first 3D model of an environment and a second 3D model of the environment according to claim 1.

19. An arrangement (600) for identifying a difference between a first 3D model (101a) of an environment and a second 3D model (101b) of the environment, the arrangement comprising:
   a memory (654) or means for providing access to the first and second 3D model, wherein the first and second 3D model each comprise a plurality of points or parts, wherein each point or part of the first and second model comprises geometrical information and texture information; and a processing element (650) configured to:
- automatically match corresponding points or parts of the first and second 3D model based on the geometrical information and/or the texture information, and
- automatically compare the matched points or parts of the first and second model to determine at least one difference value based on the geometrical information and the texture information of the first and second model,
- wherein the automatic comparison of the matched points or parts of the first and second model to determine the at least one difference value based on the geometrical information and the texture information comprises the processing element:
  - for each point or part of the first 3D model, searching for a closest point in the second 3D model to determine at least one first difference value for that point or part;
  - for each point or part of the second 3D model, searching for a closest point in the first 3D model to determine at least one second difference value for that point or part; and
  - determining the at least one difference value further based on the at least one first difference value and the at least one second difference value.

20. An arrangement according to claim 19, wherein:
- the memory (654) or means for having access to the first and second 3D model is arranged to store an uncertainty for the geometrical information, which uncertainty is associated to each point or part of the respective 3D model, and is arranged to store an uncertainty for the texture information, which uncertainty is associated to each point or part of the respective model, and
- the processing element (650) is further configured to identify a difference between the first and second model for each point or part based on the determined at least one difference value and based on the geometrical information uncertainty for the respective model and/or the texture information uncertainty for the respective 3D model.

21. An arrangement according to claim 19, wherein the processing element is further configured to classify an identified difference between the first and second model, comprising to determine whether the identified difference is caused by natural variations.

22. An arrangement according to claim 19, further comprising a presentation unit, arranged to present information related to the part or points of the models for which a difference has been identified.

* * * * *